US011240151B2

(12) United States Patent
Frink et al.

(10) Patent No.: US 11,240,151 B2
(45) Date of Patent: Feb. 1, 2022

(54) COMBINED INPUT AND OUTPUT QUEUE FOR PACKET FORWARDING IN NETWORK DEVICES

(71) Applicant: Juniper Networks, Inc., Sunnyvale, CA (US)

(72) Inventors: Craig R. Frink, Chelmsford, MA (US); Weidong Xu, Westford, MA (US); Anurag P. Gupta, Saratoga, CA (US); Harshad B Agashe, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 83 days.

(21) Appl. No.: 16/709,611

(22) Filed: Dec. 10, 2019

(65) Prior Publication Data
US 2021/0176171 A1 Jun. 10, 2021

(51) Int. Cl.
| | | |
|---|---|---|
| *H04L 12/28* | (2006.01) | |
| *H04L 12/721* | (2013.01) | |
| *G06F 9/48* | (2006.01) | |
| *H04L 12/713* | (2013.01) | |
| *H04L 12/741* | (2013.01) | |
| *H04L 12/861* | (2013.01) | |
| *H04L 12/70* | (2013.01) | |

(52) U.S. Cl.
CPC .......... *H04L 45/566* (2013.01); *G06F 9/4887* (2013.01); *H04L 45/586* (2013.01); *H04L 45/74* (2013.01); *H04L 49/9036* (2013.01); *H04L 49/9047* (2013.01); *H04L 2012/5681* (2013.01)

(58) Field of Classification Search
None
See application file for complete search history.

(56) References Cited

U.S. PATENT DOCUMENTS

| | | | |
|---|---|---|---|
| 8,040,901 B1 | 10/2011 | Kompella et al. | |
| 8,797,877 B1 | 8/2014 | Perla et al. | |
| 2016/0127267 A1* | 5/2016 | Kumar | H04L 49/10 370/400 |

(Continued)

OTHER PUBLICATIONS

Extended Search Report from counterpart European Application No. 20170767.6, dated Sep. 15, 2020, 14 pp.

(Continued)

*Primary Examiner* — Phirin Sam
(74) *Attorney, Agent, or Firm* — Shumaker & Sieffert, P.A.

(57) ABSTRACT

An apparatus for switching network traffic includes an ingress packet forwarding engine and an egress packet forwarding engine. The ingress packet forwarding engine is configured to determine, in response to receiving a network packet, an egress packet forwarding engine for outputting the network packet and enqueue the network packet in a virtual output queue. The egress packet forwarding engine is configured to output, in response to a first scheduling event and to the ingress packet forwarding engine, information indicating the network packet in the virtual output queue and that the network packet is to be enqueued at an output queue for an output port of the egress packet forwarding engine. The ingress packet forwarding engine is further configured to dequeue, in response to receiving the information, the network packet from the virtual output queue and enqueue the network packet to the output queue.

18 Claims, 9 Drawing Sheets

(56) References Cited

U.S. PATENT DOCUMENTS

| 2016/0191424 | A1* | 6/2016 | Srinivasan | H04L 47/748 |
| | | | | 370/359 |
| 2016/0226797 | A1 | 8/2016 | Aravinthan et al. | |
| 2018/0227247 | A1* | 8/2018 | Aravinthan | H04L 49/251 |
| 2019/0334828 | A1* | 10/2019 | Fairhurst | H04L 49/254 |
| 2019/0334837 | A1* | 10/2019 | Fairhurst | H04L 47/2433 |
| 2020/0044985 | A1* | 2/2020 | Wang | H04L 49/254 |
| 2020/0244769 | A1* | 7/2020 | Kumar Eerpini | H04L 47/20 |

OTHER PUBLICATIONS

Azar et al., "An Improved Algorithm for CIOQ Switches," ACM Transactions on Algorithms, vol. 2, No. 2, Apr. 2006, pp. 282-295.

Notice of Preliminary Rejection, and translation thereof, from counterpart Korean Application No. 10-2020-0050825, dated Mar. 31, 2021, 4 pp.

Office Action, and translation thereof, from counterpart Taiwan Application No. 109114443 dated Jun. 30, 2021, 9 pp.

Second Notice of Preliminary Rejection, and translation thereof, from counterpart Korean Application No. 10-2020-0050825, dated Oct. 29, 2021, 10 pp.

Response to Extended Search Report dated Sep. 15, 2020, from counterpart European Application No. 20170767.6, filed Dec. 16, 2021, 66 pp.

\* cited by examiner

COMBINED INPUT AND OUTPUT QUEUE FOR PACKET FORWARDING IN NETWORK DEVICES

TECHNICAL FIELD

This disclosure generally relates to computing devices and, particularly, queuing in networking devices.

BACKGROUND

A computer network is a collection of interconnected network devices that can exchange data and share resources. Example network devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

A router of a computer network may use one or more queues facilitate bandwidth matching between senders and receivers. The network switch may receive packets from a sender and transmit a portion of the received packets from the sender to a receiver, storing a remaining portion of the received packets in the queue. After transmitting the portion of the received packets, the network switch transmits the remaining portions of the packets stored in the queue to the receiver.

In general, it is often desirable to partition and allocate the resources so as to achieve different Quality of Service (QoS) for different types of packet flows. For example, in response to receiving a packet from the source device, a network device may classify the packet as originating from the source device and identifies a particular priority provisioned in the router for the source device. The network device then typically stores the network packet as one or more discrete data units in one of a number of queues that is associated with the determined priority. The router services the queues in a manner that satisfies each of the defined priorities. For example, during operation, the network device performs dequeue operations in accordance with the provisioned priorities to select network packets from the queues to schedule delivery of the network packets. In some instances, the network device executes multiple dequeue operations in an overlapping manner to concurrently select and service multiple queues. As one example, a network device may implement dequeue and network packet scheduling operations in a pipelined fashion such that multiple network packets are being dequeued and scheduled for processing at any given point in time. By executing these dequeue operations concurrently, the network device improves the number of network packets that can be serviced in a given amount of time.

SUMMARY

In general, this disclosure describes techniques for improved queueing systems in network devices. A network device, such as a router or a switch, may enqueue network packets in one or more queues prior to switching internally between packet forwarding engines, or prior to transmitting the packets over the network. A queueing system for a network device may be configured to combine elements of a virtual output queue (VOQ) and combined input output queue (CIOQ). As used herein, a VOQ may refer to a buffer at an ingress side, where each input port maintains a separate virtual queue for each output port. However, maintaining a separate virtual queue for each output port does not scale well. In contrast, a CIOQ may be configured to buffer at an egress side. However, a CIOQ may limit throughput of the network device due to head-of-line (HOL) blocking. For instance, CIOQ may limit throughput of the network device due to HOL blocking across a switching fabric when an input queue aggregates multiple flows intending to reach an egress packet forwarding engine or when multiple ingress packet forwarding engines try to reach the same egress packet forwarding engine and the bandwidth of the egress packet forwarding engine is exceeded.

In accordance with the techniques of the disclosure, a network device may be configured to provide "CIOQ behavior" that enables output queue scaling. For example, the network device may be configured to use virtual output queuing at egress as the local output queue. For instance, the network device may be configured to enqueue a network packet at a VOQ for a packet forwarding engine and the packet forwarding engine will schedule the network packet to be enqueued at a particular port of the packet forwarding engine. In this instance, network device may "loopback" information indicating the network packet in the virtual output queue and that the network packet is to be enqueued at as output queue for the particular port. In this way, the network device may allow queue scale to increase as more packet forwarding engines are added to the system while helping to minimizing head-of-line blocking across the switch fabric.

In one example, an apparatus for switching network traffic includes an ingress packet forwarding engine implemented in circuitry and configured to: determine, in response to receiving a network packet, an egress packet forwarding engine for outputting the network packet; and enqueue the network packet in a virtual output queue for output to the egress packet forwarding engine; the egress packet forwarding engine implemented in processing circuitry and configured to, in response to a first scheduling event, output, to the ingress packet forwarding engine, information indicating the network packet in the virtual output queue and that the network packet is to be enqueued at an output queue for an output port of the egress packet forwarding engine; wherein the ingress packet forwarding engine is further configured to, in response to receiving the information: dequeue the network packet from the virtual output queue; and enqueue the network packet to the output queue; and wherein the egress packet forwarding engine is further configured to, in response to a second scheduling event that is after the first scheduling event: dequeue the network packet from the output queue; and output the network packet at the output port.

In another example, a method includes: determining, in response to receiving a network packet and by an ingress packet forwarding engine implemented in processing circuitry, an egress packet forwarding engine for outputting the network packet; enqueuing, by the ingress packet forwarding engine, the network packet in a virtual output queue for output to the egress packet forwarding engine; outputting, in response to a first scheduling event and by the egress packet forwarding engine implemented in processing circuitry, to the ingress packet forwarding engine, information indicating the network packet in the virtual output queue and that the network packet is to be enqueued at an output queue for an output port of the egress packet forwarding engine;

dequeuing, in response to receiving the information and by the ingress packet forwarding engine, the network packet from the virtual output queue and enqueuing, by the ingress packet forwarding engine, the network packet to the output queue; and dequeuing, in response to a second scheduling event that is after the first scheduling event and by the egress packet forwarding engine, the network packet from the output queue and outputting, by the egress packet forwarding engine, the network packet at the output port.

In another example, an apparatus for switching network traffic includes: a plurality of interface cards; an ingress packet forwarding engine implemented in circuitry and configured to: determine, in response to receiving a network packet with the plurality of interface cards, an egress packet forwarding engine for outputting the network packet; and enqueue the network packet in a virtual output queue for output to the egress packet forwarding engine; the egress packet forwarding engine implemented in processing circuitry and configured to, in response to a first scheduling event, output, to the ingress packet forwarding engine, information indicating the network packet in the virtual output queue and that the network packet is to be enqueued at an output queue for an output port of the egress packet forwarding engine; wherein the ingress packet forwarding engine is further configured to, in response to receiving the information: dequeue the network packet from the virtual output queue; and enqueue the network packet to the output queue; and wherein the egress packet forwarding engine is further configured to, in response to a second scheduling event that is after the first scheduling event: dequeue the network packet from the output queue; and output, with the plurality of interface cards, the network packet at the output port.

In one example, an apparatus includes: means for determining, in response to receiving a network packet, an egress packet forwarding engine for outputting the network packet; means for enqueuing the network packet in a virtual output queue for output to the egress packet forwarding engine; means for outputting, in response to a first scheduling event, information indicating the network packet in the virtual output queue and that the network packet is to be enqueued at an output queue for an output port of the egress packet forwarding engine; means for dequeuing, in response to receiving the information, the network packet from the virtual output queue and means for enqueuing the network packet to the output queue; and means for dequeuing, in response to a second scheduling event that is after the first scheduling event, the network packet from the output queue and means for outputting the network packet at the output port.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
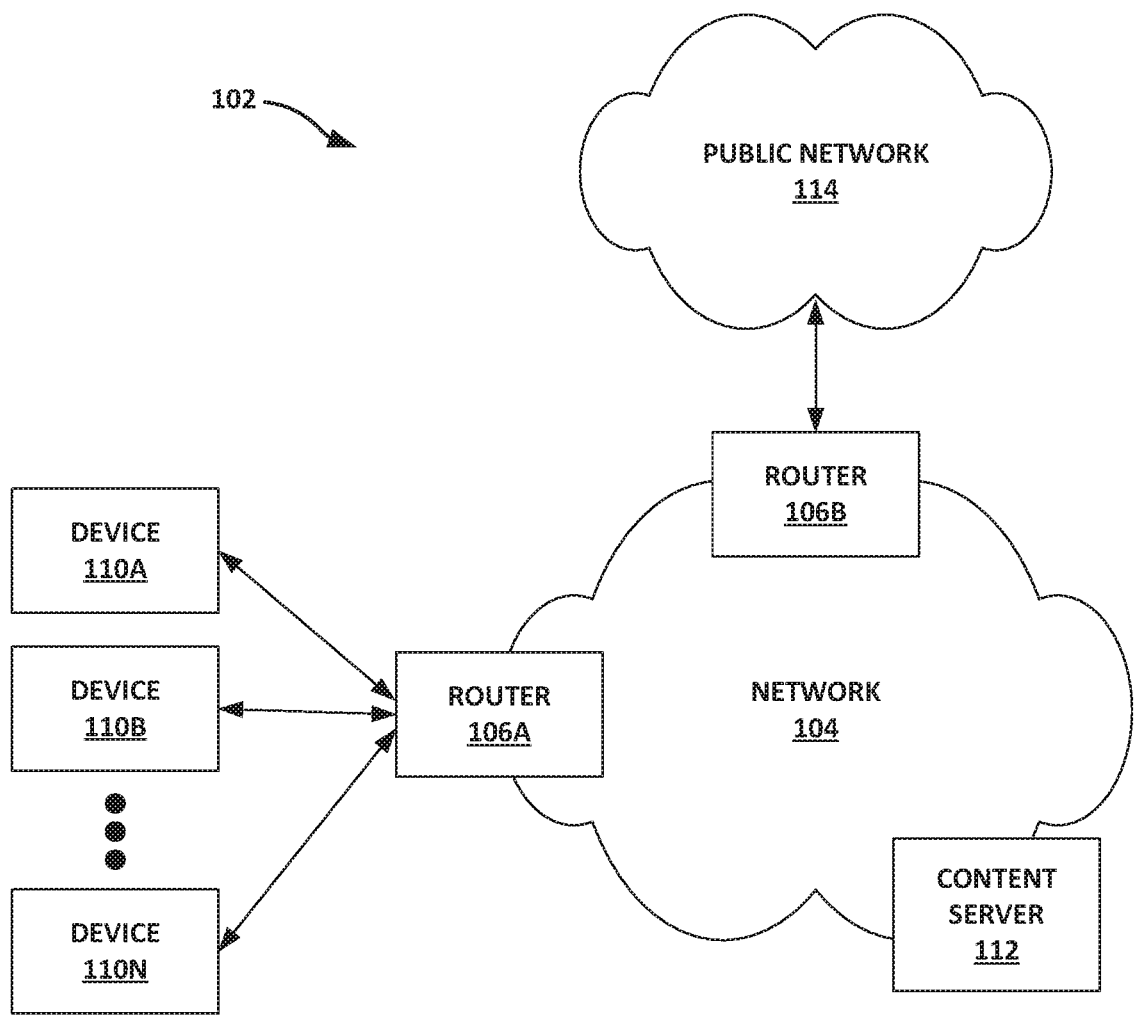
FIG. 1 is a block diagram illustrating an example network in accordance with the techniques of the disclosure.

Some systems use a Combined Input and Output Queuing (CIOQ) for a large queue scale. In CIOQ systems, a packet buffer, such as, for example, a Delay Bandwidth Buffer (DBB) and Output Queues (OQ) are held at egress along with Congestion Management (CM) and hierarchical scheduling. In some examples, a CIOQ system may include fine grain queueing at ingress. Accordingly, in CIOQ, small fabric Input Queues (IQ) may be used at ingress (e.g., one per destination packet forwarding engine). With CIOQ, the queue scale increases as more packet forwarding engines are added to the system, because network packets fanout at egress per queue.

However, CIOQ systems may suffer from fabric congestion that may be addressed, for example, using fabric overspeed (e.g., 2X) to satisfy Quality of Service (QoS) targets. Fabric congestion may occur when multiple input ports on different packet forwarding engines attempt to reach the same egress OQ. In this example, the CIOQ system may drop network packets at the ingress fabric interface. The ingress fabric queues may aggregate the traffic through relatively small queues (e.g., stored in On-Chip-Memory (OCM)) with only a few priority constrains and without per-queue QoS guarantees.

To avoid the foregoing difficulties associated with CIOQ systems, some network devices may use virtual output queuing. In virtual output queuing, each ingress packet forwarding engine includes a virtual output queue (VOQ) that uniquely identifies an Egress OQ. A VOQ (e.g., one VOQ on each packet forwarding engine) may combine with an OQ to form the queue. The VOQ on ingress may provide a delay bandwidth buffer with only a small OQ at egress (e.g., only at a head of the queue is available at egress for scheduling to a port). Because the DBB is kept at ingress in virtual output queuing, such systems may omit techniques for mitigating head-of-line blocking across the switch fabric. Such head-of-line blocking may be due to the egress scheduling of the VOQ, which together with fair fabric scheduling may use little or no overspeed.

Virtual output queuing, however, may lack OQ scaling. Because each ingress packet forwarding engine may use a VOQ for each egress OQ, the number of VOQ on the ingress packet forwarding engine determines a maximum OQ scale.

As such, rather than increasing queue scale as more packet forwarding engines are added, in the case of CIOQ systems, the VOQ system may have a maximum number of OQ that is determined by the number of VOQ on the ingress packet forwarding engine (e.g., 48,000 OQs), considering that ingress memory committed to queueing is finite and may not be easily upgraded to add additional storage capacity. Because the total number of OQ does not grow with the addition of packet forwarding engines, the average number of OQ per packet forwarding engine becomes smaller as more packet forwarding engines are added to a system. For a hierarchical quality of service solution, systems using virtual output queues may limit a number of packet forwarding engines supported in a system to a small number (e.g., 4 or 8 packet forwarding engines).

Techniques described herein describe a system configured to provide "CIOQ behavior" that enables OQ scaling in stand-alone (e.g., combined buffer (CBUF) local switching) and fabric based systems. In some examples, a system may use virtual output queues at egress as the OQ. For instance, a system may enqueue a network packet at a VOQ for a packet forwarding engine and the packet forwarding engine will schedule the network packet to be enqueued at a particular port of the packet forwarding engine. In this instance, the system may "loopback" information (e.g., packet header with packet payload, only meta data, etc.) indicating the network packet in the virtual output queue and that the network packet is to be enqueued as an output queue for the particular port. Techniques described may include a system that may loopback the information locally using metadata. In some examples, a system may loopback the information by looping back the network packet with a header and a packet payload for the network packet. In this way, the system may allow queue scale to increase as more packet forwarding engines are added to the system while helping to minimize head-of-line blocking across the switch fabric. For example, the system may have some head-of-line blocking if multiple flows aggregate through a single ingress queue on an ingress packet forwarding engine but are later separated out into separate output queues at an egress packet forwarding engine.

FIG. 1 is a block diagram illustrating an exemplary system 102 in which network 104 includes routers 106A-106B (collectively, routers 106). Devices 110A-110N (collectively, devices 110) connect to network 104 via routers 106 in order to access resources provided by network 104. Each of devices 110 may be an end-user computing device, such as a personal computer, a laptop computer, a mobile telephone, a network telephone, a television set-top box, a video game system, a point-of-sale device, a personal digital assistant, an intermediate network device, a network appliance, a supercomputer, a mainframe computer, an industrial robot, or another type of device capable of interfacing with and communicating over network 104.

Network 104 may include a plurality of network devices that facilitate the access of content by devices 110. Each of the plurality of network devices may comprise one of a router (e.g., routers 106), a switch, a server, a database server, a hub, a firewall, an Intrusion Detection/Prevention (IDP) device and/or any other type of networking equipment or device that facilitates the transfer of data to and from devices 110. Network 104 includes routers 106, which communicate using various protocols, such as the Border Gateway Protocol and the Internet Control Message Protocol, in order to exchange routing, network configuration information, and other information. The network may be a local area network ("LAN"), such as a token ring or Ethernet network, a virtual local area network ("VLAN"), or another type of network. The network may comprise one or more wired or wireless links. For example, network 104 may be an Ethernet network that comprises one or more Ethernet cables. In another example, the network may be a Wireless Fidelity ("Wi-Fi") network that uses wireless radio transmissions to communicate information. In another example, network 104 may be a mobile network. Although shown as a single network 104 in FIG. 1, network 104 may comprise any number of interconnected networks, either public or private, in which the various networks interconnect to form one or more virtual networks.

Network 104 provides a variety of resources that may be accessed by devices 110. In the example of FIG. 1, network 104 includes content server 112 that stores or otherwise sources content, which, as the term is used herein, refers to any data commonly transmitted and/or stored within a network, such as web-based applications, images, documents, web pages, video data, audio data such as voice, web-based games, scripts, or any other type of network-based content. Network 104 may support multicast techniques to improve the delivery efficiency of data transmitted with the network. Typically network 104 will also connect to a variety of other types of devices (e.g., file servers, printers, telephones, and e-mail and other application servers). Network 104 is also shown coupled to public network 114 (e.g., the Internet) via router 106B. Public network 114 may include, for example, one or more client computing devices. Public network 114 may provide access to web servers, application servers, public databases, media servers, end-user devices, and many other types of network resource devices and content.

Network 104 may transmit content to devices 110 through router 106A using one or more packet-based protocols, such as an Internet Protocol (IP)/Transmission Control Protocol (TCP). In this respect, network 104 may support the transmission of data via discrete data units, often referred to as "network packets," or simply "packets." As a result, network 104 may be referred to as a "packet-based" or "packet switched" network. While described in this disclosure as transmitting, conveying, or otherwise supporting packets, network 104 may transmit data according to any other discrete data unit defined by any other protocol, such as a cell defined by the Asynchronous Transfer Mode (ATM) protocol, or a datagram defined by the User Datagram Protocol (UDP).

Network traffic delivered by network 104 may be classified according to a number of categories. For instance, content server 112 may stream live video to one of devices 110 through router 106A. Packets that transmit such video may be classified as streaming multimedia packets. Content server 112 may also send web pages to one of devices 110 using HTTP packets. As another example, information exchanged by routers 106 may be categorized as network management traffic. In addition to being classified by application, network traffic may be classified by source or destination, user, protocol, and port (for TCP and UDP), among others characteristics.

Various categories of network traffic may require a certain level of network performance. For example, streaming multimedia may require guaranteed bandwidth to provide an acceptable user experience. As another example, network management traffic should experience low delays in order to maintain the efficiency of a network. Also, internet service providers (ISPs) may prioritize traffic for certain users over others based on a service provider agreement. To meet these requirements, network 104 includes mechanisms to support Quality of Service (QoS) guarantees according to a number of predefined QoS levels.

Routers 106 receive, analyze, and classify packets to assign the packets to a suitable priority level. In addition to classifying packets, routers 106 process the received and classified packets according to their priority level. In this manner, routers 106 implement aspects of the QoS guarantees provided by network 104. In addition, based on information received from other devices in system 102, routers 106 determine the appropriate route through the system for each received packet and forwards the packet accordingly.

Routers 106 may regulate a speed at which packets are transmitted to prevent flooding on the network. For example, routers 106 may include a token bucket shaper that spends "tokens" to dequeue a corresponding amount of bytes from a queue and transmit them over the network, and may not transmit packets if the token bucket shaper has insufficient tokens to spend. In other words, each token may correspond to a number of bytes that the token bucket shaper is permitted to dequeue from the queue and transmit over the network. In this way, the token bucket shaper acts to regulate the speed at which packets are removed from the queue and transmitted on the network.

Some routers may use a CIOQ techniques, that use a delay bandwidth buffer and output queues that hold packets at egress along with congestion management and hierarchical scheduling. In this example, a CIOQ system may use fabric input queues at ingress (e.g., one per destination packet forwarding engine). As such, the queue scale increases as more packet forwarding engines are added to the CIOQ system, because network packets fanout at egress per queue. However, CIOQ systems may suffer from fabric congestion that may be addressed, for example, using fabric overspeed (e.g., 2X) to satisfy Quality of Service (QoS) targets. Fabric congestion may occur when multiple input ports on different packet forwarding engines attempt to reach the same egress OQ. In this example, the CIOQ system may drop network packets at the ingress fabric interface. The ingress fabric queues may aggregate the traffic through relatively small queues (e.g., stored in On-Chip-Memory (OCM)) with only a few priority constrains and without per-queue QoS guarantees.

Some network devices may use virtual output queuing. In virtual output queuing, a router may use a virtual output queue (VOQ) that uniquely identifies an egress OQ. A VOQ (e.g., one VOQ on each packet forwarding engine) may combine with an OQ to form the queue. The VOQ on ingress may provide a delay bandwidth buffer with only a small OQ at egress (e.g., only at a head of the queue is available at egress for scheduling to a port). Because the delay bandwidth buffer is kept at ingress in virtual output queuing, systems using VOQ techniques may omit techniques for mitigating head-of-line blocking across the switch fabric. Routers configured to use virtual output queuing, however, may lack OQ scaling. Because each ingress packet forwarding engine may use a VOQ for each egress OQ, the number of VOQ on the ingress packet forwarding engine determines a maximum OQ scale.

In accordance with the techniques of the disclosure, routers 106 may be configured to provide "CIOQ behavior" that enables OQ scaling in stand-alone (e.g., combined buffer (CBUF) local switching) and fabric based systems. For example, router 106A may be configured to use virtual output queues at egress as the OQ. For instance, router 106A may be configured to enqueue a network packet at a VOQ for an egress packet forwarding engine and the egress packet forwarding engine will schedule the network packet to be enqueued at a particular port of the packet forwarding engine. In this instance, router 106A may "loopback," to an ingress packet forwarding engine, information indicating the network packet in the virtual output queue and that the network packet is to be enqueued at an output queue for the particular port. Techniques described may include a system that may loopback the information locally using metadata. In some examples, router 106A may loopback the information by looping back the network packet with a header and a packet payload for the network packet. In this way, router 106A may allow queue scale to increase as more packet forwarding engines are added to the system while helping to minimize head-of-line blocking across the switch fabric.

In operation, router 106A may determine, in response to receiving a network packet, an egress packet forwarding engine for outputting the network packet. For example, router 106A may determine an egress packet forwarding engine of router 106A. In some examples, router 106A may determine the egress packet forwarding engine that corresponds to a next hop. For instance, router 106A may determine, in response to determining that a packet label of the network packet specifies an IP address, a next-hop for the network packet. In this instance, router 106A may determine the egress packet forwarding engine assigned to a port that corresponds to the next-hop for the network packet.

Router 106A may enqueue the network packet in a virtual output queue for output to the egress packet forwarding engine. For example, router 106A stores the network packet (e.g., packet payload, packet header, etc.) at the virtual output queue. In response to a first scheduling event, router 106A may output, to the ingress packet forwarding engine, information indicating the network packet in the virtual output queue and that the network packet is to be enqueued at an output queue for an output port of the egress packet forwarding engine. For example, router 106A may determine, using quality of service for different types of packet flows and/or a dequeue rate, to schedule the network packet for queueing by the egress packet forwarding engine for processing by the egress packet forwarding engine. To output the information, router 106A may output a network packet via a port of the egress router to a port of the ingress router a packet payload for the network packet and a header for the network packet that includes the information. In some examples, to output the information, router 106A may output metadata using local switching (e.g., using a combined buffer) without outputting the packet payload.

In response to receiving the information, the ingress packet forwarding engine of router 106A may dequeue the network packet from the virtual output queue. For example, router 106A may remove the network packet (e.g., packet payload and packet header) and/or a pointer representing the network packet from the virtual output queue. Router 106A may enqueue the network packet to the output queue. For example, router 106A may add the network packet and/or a pointer representing the network packet to the output queue.

In response to a second scheduling event that is after the first scheduling event, router 106A may dequeue the network packet from the output queue and output the network packet at the output port. For example, router 106A may determine, using quality of service for different types of packet flows and/or a dequeue rate, to schedule the network packet for queueing by the egress packet forwarding engine at an output queue for the output port. In response to the second scheduling event, router 106A may output the network packet (e.g., packet payload and packet header) at the output port and remove the network packet (e.g., packet payload and packet header) and/or a pointer representing the network packet from the output queue for the output port.

In this way, router 106A may have higher scalability compared to routers that use VOQ. For example, using techniques described herein, router 106A may increase the output queue scale, which may help to support a larger number of customers, thereby improving an operation of a router. For example, assuming each packet forwarding engine of four packet forwarding engines supports 48,000 queues, the combination of the four packet forwarding engines using VOQ techniques may support only 48,000 queues. However, in accordance with the techniques of the disclosure, the combination of four packet forwarding engines using combined buffer techniques may support 192,000 queues (i.e., 4×48,000), which may allow the router to support additional customers and, therefore, may improve a performance of router 106A. In some examples, router 106A may have a lower product cost compared to routers configured to use CIOQ. Additionally, techniques described herein may be used with VOQ techniques and/or CIOQ. For instance, router 106A may use VOQ for internet facing traffic and techniques described herein using a combined buffer for inbound traffic from the internet (e.g., for customer queueing).

Routers 106 may use techniques described herein to use a virtual output queue as an output queue. However, in some examples, some of routers 106 may use other techniques, such as, for example, virtual output queueing, CIOQ, or another queueing technique. Although the principles described herein are discussed with reference to routers 106, other network devices, such as, for example, but not limited to, an Asynchronous Transfer Mode (ATM) switch, a local area network (LAN) switch, an interface card, a gateway, a firewall, or another device of system 102 may determine a predicted lifetime.

Figure 2:
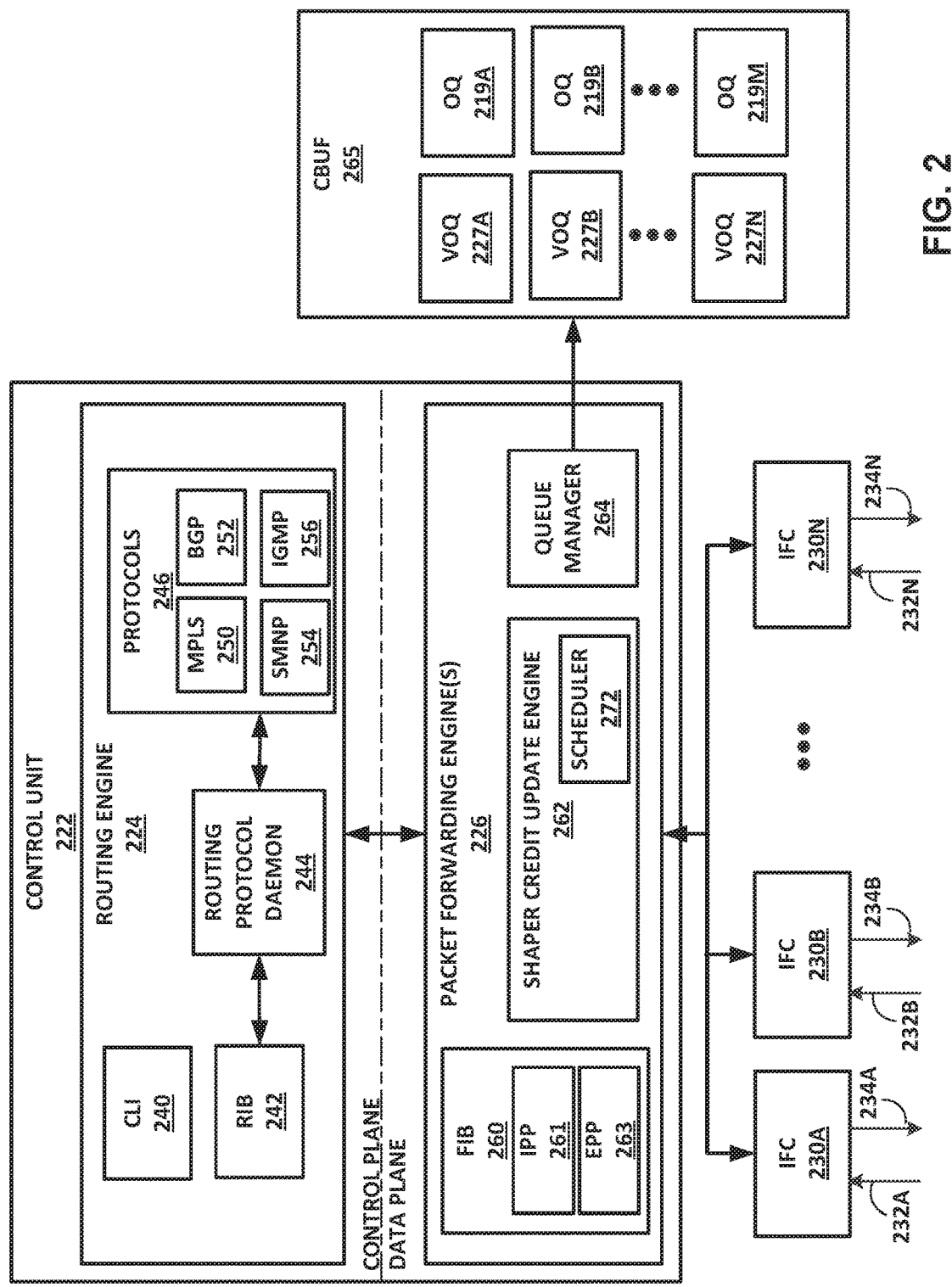
FIG. 2 is a block diagram illustrating an example router within the network of FIG. 1 in accordance with the techniques of the disclosure.

FIG. 2 is a block diagram illustrating an example router 206 within network 104 of FIG. 1 in accordance with the techniques of the disclosure. In general, router 206 may operate substantially similar to routers 106 of FIG. 1. In this example, router 206 includes interface cards 230A-230N ("IFCs 230") that receive network packets via incoming links 232A-232N ("incoming links 232") and send network packets via outbound links 234A-234N ("outbound links 234"). IFCs 230 may be coupled to links 232, 234 via a number of interface ports. Router 206 may include a control unit 222 that determines routes of received packets and forwards the packets accordingly via IFCs 230, in communication with control unit 222.

Control unit 222 includes a routing engine 224 and a packet forwarding engine 226. Routing engine 224 operates as the control plane for router 206 and includes an operating system (not shown) that provides a multi-tasking operating environment for execution of a number of concurrent processes. Routing engine 224, for example, executes software instructions to implement one or more control plane networking protocols 246. For example, protocols 246 may include one or more routing protocols, such as BGP 252, for exchanging routing information with other routing devices and for updating routing information base (RIB) 242. Protocols 246 may further include transport protocols, such as Multiprotocol Label Switching (MPLS) protocol 250, and multicast management protocols, such as Internet Group Management Protocol (IGMP) 256. In other examples, protocols 246 may include other routing, transport, management, or communication protocols.

In some examples, routing engine 224 includes command line interface (CLI) 240 to permit an administrator to configure and/or manage router 206. For example, the administrator may, via CLI 240, access queue manager 264 to configure one or more parameters of packet forwarding engines 226. In another example, routing engine 224 includes a graphical user interface (GUI) instead of a CLI. In a still further example, routing engine executes Simple Network Management Protocol (SMNP) 254 to permit the administrator to configure and/or control router 206 from a remote terminal.

Routing protocol daemon (RPD) 244 may execute BGP 252 or other routing protocols to update RIB 242. RIB 242 describes a topology of the computer network in which router 206 resides, and also includes routes through the computer network. RIB 242 describes various routes within the computer network, and the appropriate next hops for each route, i.e., the neighboring routing devices along each of the routes. RPD 244 analyzes information stored in RIB 242 and generates forwarding information for packet forwarding engine 226, which stores the forwarding information in forwarding information base (FIB) 260. RPD 244 may, in other words, resolve routing information stored by RIB 242 to obtain the forwarding information identifying a next hop for each destination within the network, storing the forwarding information to FIB 260.

Combined buffer ("CBUF") 265 may act as queue storage for packet forwarding engines 226 of router 206. CBUF 265 may include local memory (e.g., on chip memory (OCM)) and/or external memory (e.g., High Bandwidth Memory (HBM)). In accordance with the techniques of the disclosure, CBUF 265 may store queues for router 206. In some examples, CBUF 265 comprises random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

CBUF 265 may include one or more queues that are a first-in first-out (FIFO) data structure for organization and temporary storage of data. In the example of FIG. 2, queues of CBUF 265 may store one or more network packets for router 206. For example, router 206 may store the one or more packets in one or more queues of CBUF 265 prior to switching internally between packet forwarding engines 226. In another example, router 206 may store the one or more packets in one or more queues of CBUF 265 prior to transmitting the network packets over the network.

For example, CBUF 265 may include virtual output queues 227A-227N (collectively referred to herein as "VOQs 227) and/or output queues 219A-219N (collectively referred to herein as "OQs 219). In some examples, each VOQ of VOQs 227 may be assigned to a respective packet forwarding engine of packet forwarding engines 226. For instance, VOQ 227A may be assigned to a first packet forwarding engine of packet forwarding engines 226, VOQ 227B may be assigned to a second packet forwarding engine of packet forwarding engines 226, and so on. Each OQ of OQs 219 may be assigned to a respective port of packet forwarding engine of packet forwarding engines 226. For instance, OQ 219A may be assigned to a first port of a first packet forwarding engine of packet forwarding engines 226, OQ 219B may be assigned to a second port of the first packet forwarding engine, and so on.

Packet forwarding engine 226 operates as the data plane for router 206 and includes FIB 260, shaper credit update engine 262 and queue manager 264. Packet forwarding engine 226, for example, processes packets forwarded and received by router 206 via IFCs 230. For example, packet forwarding engine 226 may apply filters and routing policies to outgoing packets and forward the packets to a next hop in the network. In some examples, control unit 222 includes a plurality of packet forwarding engines, each of which are configured to operate similar to packet forwarding engine 226 to provide packet forwarding functions for different flows of network traffic. As used herein, ingress packet forwarding engine and egress packet forwarding engine are merely terms for providing context relating to a specific network packet. That is, all packet forwarding engines 226 may act as an ingress packet forwarding engine when receiving packets and an egress packet forwarding engine when transmitting network packets. In some examples, a single packet forwarding engine may act as both the ingress packet forwarding engine and the egress packet forwarding engine for a single packet.

FIB 260 may associate, for example, network destinations for network traffic with specific next hops and corresponding IFCs 230 and physical output ports for output links 234. FIB 260 may be a radix tree programmed into dedicated forwarding chips, a series of tables, a complex database, a link list, a radix tree, a database, a flat file, or various other data structures. In some examples, FIB 260 includes lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a network packet, dropping a network packet, and/or forwarding a network packet using an interface and/or interface identified by the one or more next hops. As shown, FIB 260 may include an Ingress Packet Processor (IPP) 261 and an Egress Packet Processor (EPP) 263). IPP 261 may determine a packet forwarding engine of packet forwarding engines 226 that acts as an egress packet forwarding engine for a network packet. EPP 263 may determine output queue forward statistics at egress.

Queue manager 264 of packet forwarding engine 226 may work with shaper credit update engine 262 to perform management functions for VOQs 227 and OQs 219. For example, shaper credit update engine 262 may implement token bucket shaper data structures to determine dequeue rates for VOQs 227. In this example, queue manager 264 may regulate a flow of network packets to VOQs 227 using the dequeue rates specified by shaper credit update engine 262. Similarly, shaper credit update engine 262 may implement token bucket shaper data structures to determine dequeue rates for OQs 219. In this example, queue manager 264 regulates the flow of network packets from OQs 219 using the dequeue rates specified by shaper credit update engine 262. Shaper credit update engine 262 is described further with reference to FIG. 3.

In accordance with techniques described herein, packet forwarding engines 226 may be configured to reuse VOQs 227 (e.g., ingress VOQs) as egress OQs. For instance, a first packet forwarding engine of packet forwarding engines 226 may act as an ingress packet forwarding engine that uses VOQ 227A as an ingress VOQ. In this example, VOQ 227 may be "reused" as an egress OQ by a second packet forwarding engine of packet forwarding engines 226. In this instance, the egress packet forwarding engine may "loopback," to the ingress packet forwarding engine, information indicating the network packet in VOQ 227 and that the network packet is to be enqueued at an OQ 219A for the particular port. In some examples, one or more packet forwarding engines of packet forwarding engines 226 may use VOQs 227 as VOQs at ingress. Because the total number of OQ grows with the addition of packet forwarding engines, the average number of OQ per packet forwarding engine becomes larger as more packet forwarding engines are added to a system. In this way, OQ scaling may occur when multiple packet forwarding engines are added to a system (e.g., 40,000 per packet forwarding engine).

Each OQ of OQs 219 may be scheduled to an egress port, which may place queueing at an egress port. Ingress packet forwarding engines of packet forwarding engines 226 may support a small number of fabric input queue (e.g., one of VOQs 227) per destination packet forwarding engine with OQ. For instance, queue manager 264 may use one VOQ per destination packet forwarding engine loopback channel with priority (e.g., up to 8 Priority per destination packet forwarding engine). In some examples, IPP 261 may perform a lookup to determine an egress packet forwarding engine of packet forwarding engines 226 and OQ (e.g., VOQ) per egress output port. For instance, IPP 261 may insert a VOQ number for an OQ at egress in a network packet prepend sent from ingress to egress.

Shaper credit update engine 262 may include a Grant Scheduler (GS) 272, which is also referred to herein as "scheduler 272" at egress, which may be configured to schedule network packets from VOQ to fabric and from OQ to the port. For instance, scheduler 272 may schedule fabric packets/pages from an ingress packet forwarding engine to an egress packet forwarding engine. Scheduler 272 may be configured to schedule network packets from OQ to the port on egress packet forwarding engine.

Scheduler 272 may directly schedule an egress packet forwarding engine with OQ to the port. For example, scheduler 272 may include an 8K Queue and there are five 8K Queues (e.g., 5×8K is 40K OQ per packet forwarding engine). In this instance, scheduler 272 may not use fabric for scheduling to port for deterministic behavior.

Router 206 may be configured to support mixing of VOQ and OQ in a same system. For example, router 206 may be configured such that some fabric destinations may be "typical" VOQ/OQ combinations when small queues per port are supported and other destinations may be OQ when larger queues per port are needed. In some examples, router 206 may use existing packet loopback paths on an egress packet forwarding engine to enqueue packets into an OQ with minimal changes to design to support OQ, but at possible reduced bandwidth (e.g., see FIGS. 4, 5, 6). In some examples, router 206 may be configured such that network packets arrive from fabric are looped back on egress packet forwarding engine to perform drop check and enqueue (NQ) to the OQ without any new data path needed. In this example, scheduler 272 may schedule OQ direct to port.

Figure 6:
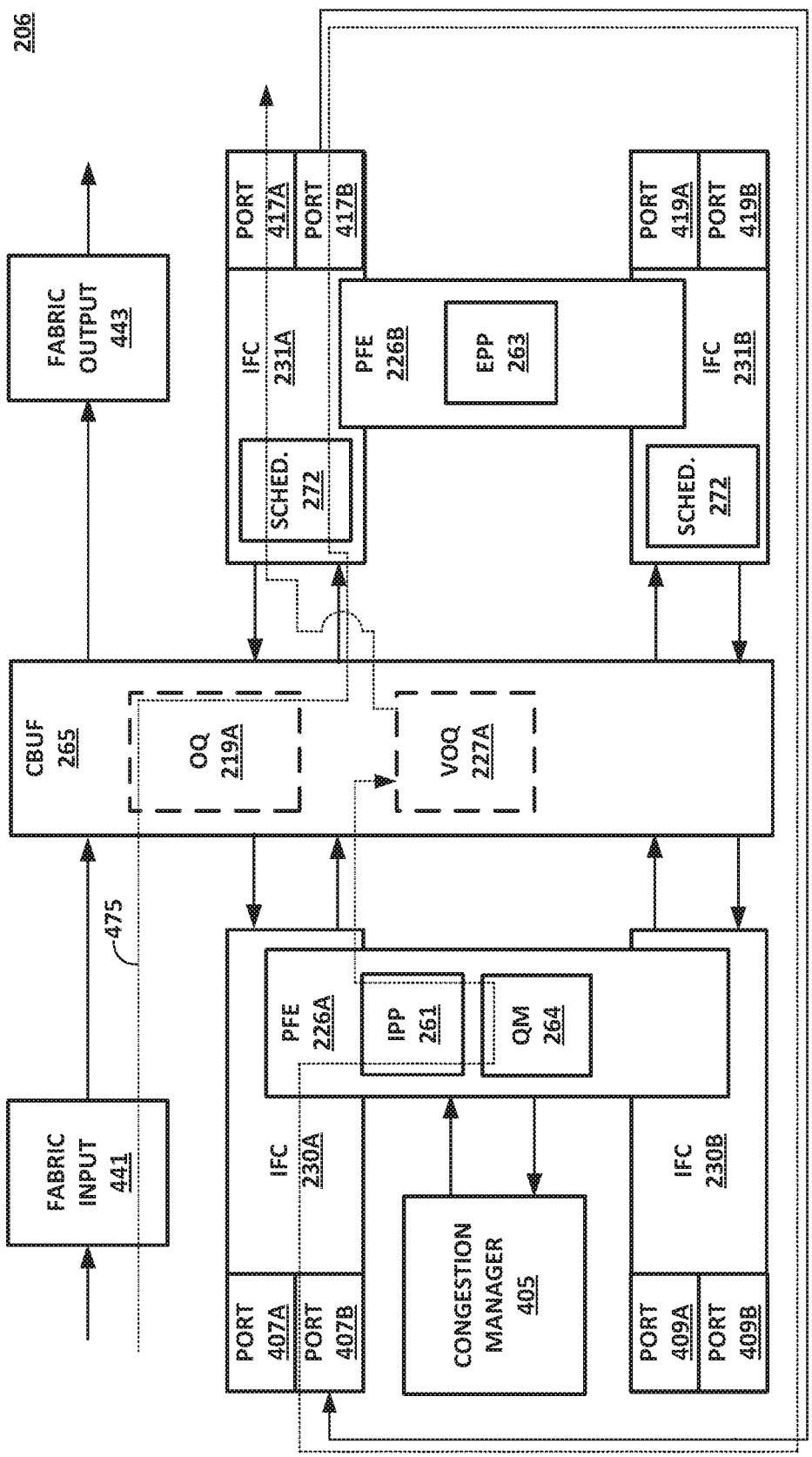
FIG. 6 is a block diagram illustrating an example router switching fabric network traffic from ingress using network packet loopback in accordance with techniques of this disclosure.
Figure 7:
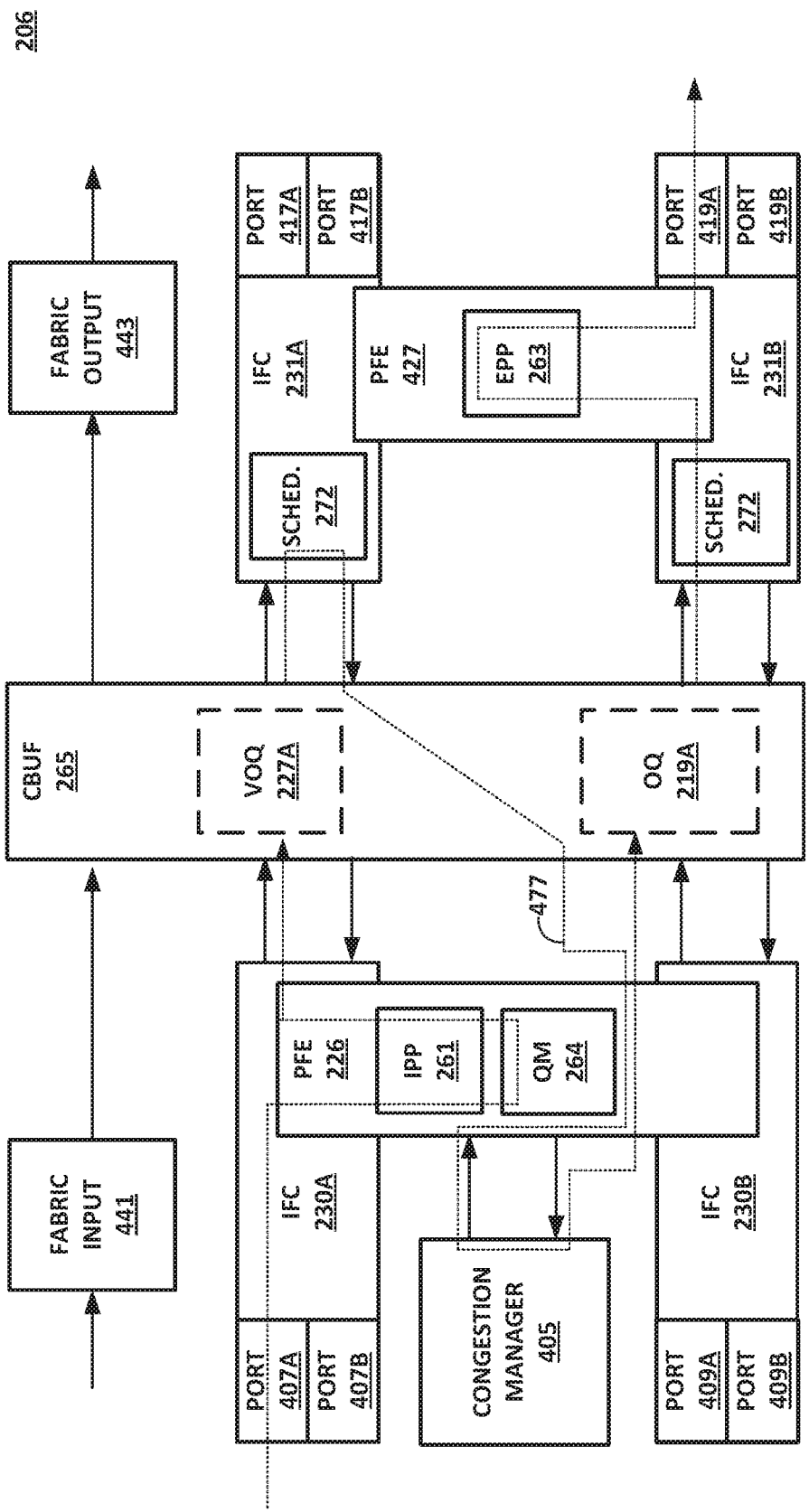
FIG. 7 is a block diagram illustrating an example router switching local network traffic using metadata loopback in accordance with techniques of this disclosure.
Figure 8:
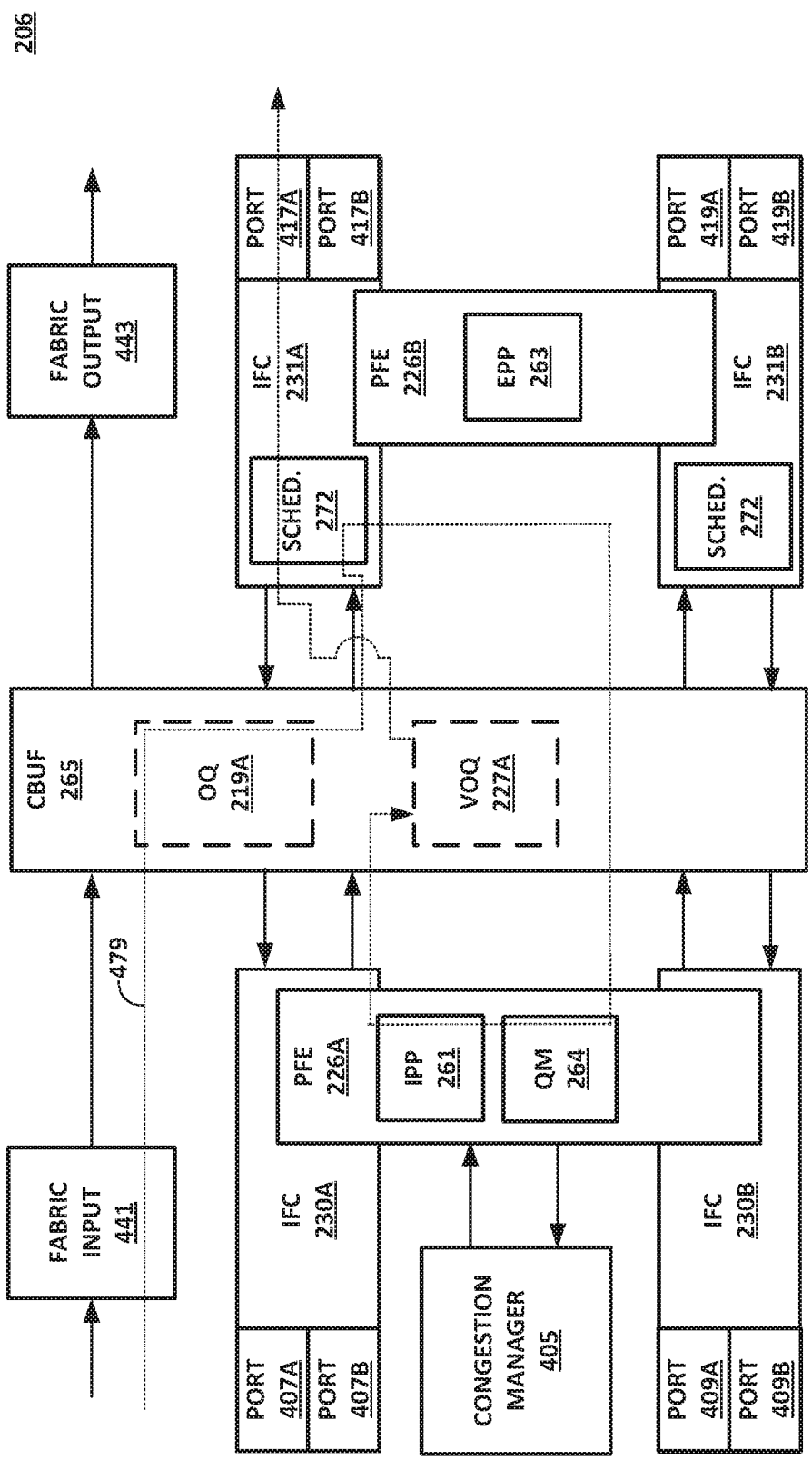
FIG. 8 is a block diagram illustrating an example router switching fabric network traffic from ingress using metadata loopback in accordance with techniques of this disclosure.

Router 206 may use dedicated data paths at egress to achieve full performance (e.g., see FIGS. 6, 7, 8). For example, router 206 may be configured such that network packets arrive from fabric are first checked for admittance to OQ using drop check, and if allowed are enqueued to the OQ. In this example, scheduler 272 may schedule from OQ direct to port. In this way, techniques described herein may use "local switching" at an egress packet forwarding engine, which may allow network packets to be received at ingress and move directly to egress without passing through fabric.

In operation, an ingress packet forwarding engine of packet forwarding engines 226 may determine, in response to receiving a network packet, an egress packet forwarding engine of packet forwarding engines 226 for outputting the network packet. For example, the ingress packet forwarding engine may determine an egress packet forwarding engine of ingress packet forwarding engines 226 for outputting the network packet. FIB 260 may determine the egress packet forwarding engine that corresponds to a next hop. For instance, FIB 260 may determine, in response to determining that a packet label of the network packet specifies an IP address, a next-hop for the network packet. In this instance, FIB 260 may determine an egress packet forwarding engine assigned to a port that corresponds to the next-hop for the network packet.

The ingress packet forwarding engine may enqueue the network packet in VOQ 227A for output to the egress packet forwarding engine. For example, the ingress packet forwarding engine stores the network packet (e.g., packet payload, packet header, etc.) at VOQ 227A. In response to a first scheduling event, an egress packet forwarding engine of ingress packet forwarding engine 226 may output, to the ingress packet forwarding engine, information indicating the network packet in VOQ 227A and that the network packet is to be enqueued at OQ 219A for an output port of the egress packet forwarding engine. For example, scheduler 272 may determine, using quality of service for different types of packet flows and/or a dequeue rate, to schedule the network packet for queueing by the egress packet forwarding engine for processing by the egress packet forwarding engine. To output the information, egress packet forwarding engine may output a network packet via a port of the egress router to a port of the ingress router a packet payload for the network packet and a header for the network packet that includes the information. In some examples, to output the information, egress packet forwarding engine may output metadata using local switching (e.g., using CBUF 265) without outputting the packet payload.

In response to receiving the information, the ingress packet forwarding engine may dequeue the network packet from VOQ 227A. For example, ingress packet forwarding engine may remove the network packet (e.g., packet payload and packet header) and/or a pointer representing the network packet from VOQ 227A. Ingress packet forwarding engine may enqueue the network packet to OQ 219A. For example, ingress packet forwarding engine may add the network packet and/or a pointer representing the network packet to OQ 219A.

In response to a second scheduling event that is after the first scheduling event, egress packet forwarding engine may dequeue the network packet from OQ 219A and output the network packet at the output port (e.g., link 232A with IFC 230A). For example, scheduler 272 may determine, using quality of service for different types of packet flows and/or a dequeue rate, to schedule the network packet for queueing by the egress packet forwarding engine at OQ 219A for the output port. In response to the second scheduling event, the egress packet forwarding engine may output the network packet (e.g., packet payload and packet header) at the output port and remove the network packet (e.g., packet payload and packet header) and/or a pointer representing the network packet from OQ 219A for the output port.

In this way, router 206 may have higher scalability compared to routers that use VOQ. For example, using techniques described herein, router 206 may increase the output queue scale, which may help to support a larger number of customers, thereby improving an operation of a router. For example, assuming each packet forwarding engine of four packet forwarding engines supports 48,000 queues, the combination of the four packet forwarding engines using VOQ techniques may support only 48,000 queues. However, in accordance with the techniques of the disclosure, the combination of four packet forwarding engines using combined buffer techniques may support 192,000 queues (i.e., 4×48,000), which may allow router 206 to support additional customers. In some examples, router 206 may have a lower product cost compared to routers configured to use CIOQ. Additionally, techniques described herein may be used with VOQ techniques and/or CIOQ. For instance, router 206 may use VOQ for internet facing traffic and techniques described herein using a combined buffer for inbound traffic from the internet (e.g., for customer queueing).

Figure 3:
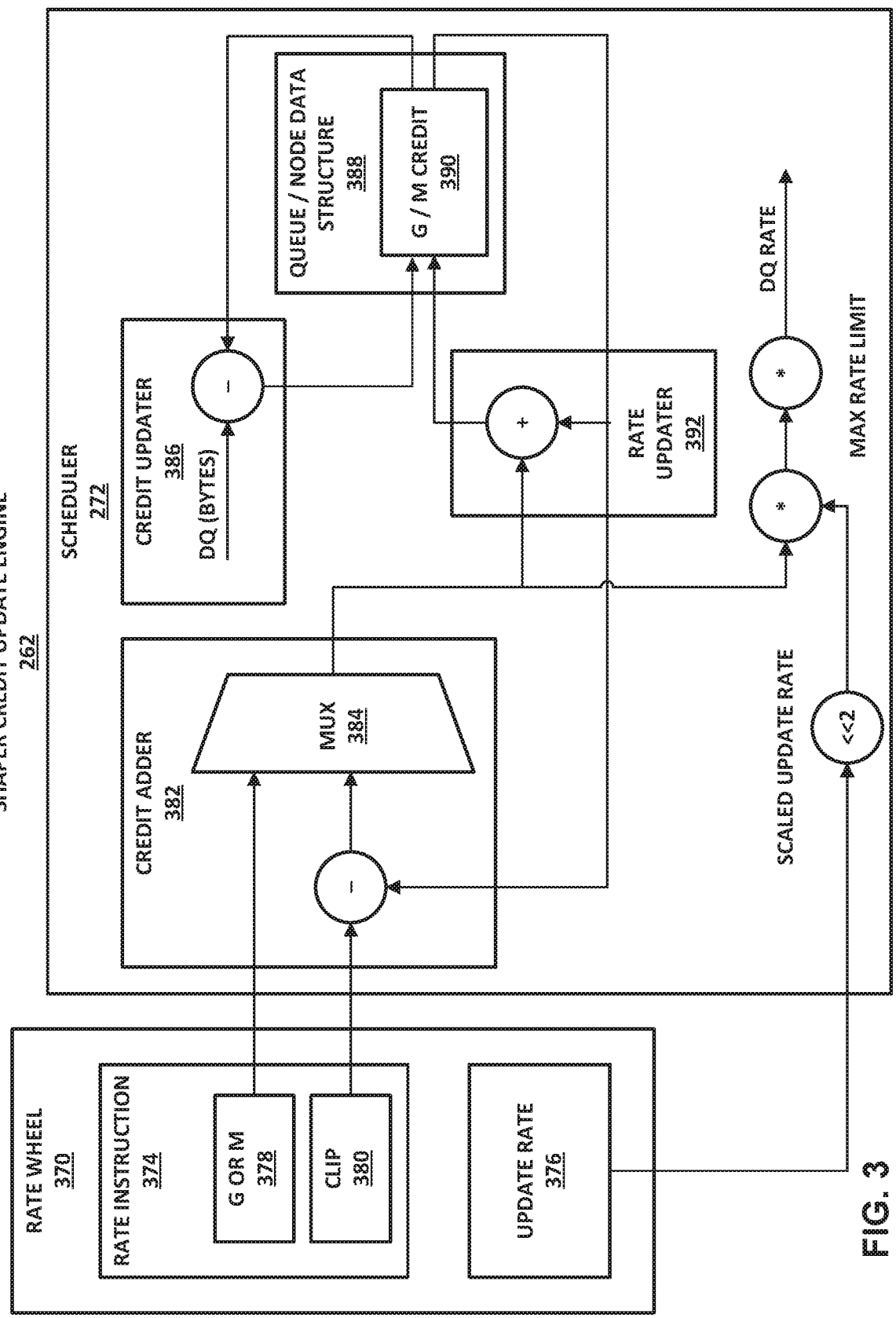
FIG. 3 is a block diagram illustrating an example shaper credit update engine within the router of FIG. 2 in accordance with the techniques of the disclosure.

FIG. 3 is a block diagram illustrating an example shaper credit update engine 262 of FIG. 2 in accordance with the techniques of the disclosure. In one example implementation, shaper credit update engine 262 includes rate wheel 370 and scheduler 272. Network devices may include shaper credit update engine 262 to regulate a speed at which packets are transmitted to prevent flooding on the network.

Rate wheel 370 provides credit updates to scheduler 272. Scheduler 272 may use credits to determine when queue/node data structure 388 is permitted to transmit one or more bytes enqueued by queue/node data structure 388. In the example of FIG. 3, rate wheel 370 includes rate instruction 374 and update rate 376. Rate instruction 374 provides rate updates for "Guaranteed" (G) and "Maximum" (M) credit fields 378 to credit adder 382 of scheduler 272. G credits may be used to allocate a guaranteed amount of bandwidth to queue/node data structure 388, unless the G rate for the network is oversubscribed. M credits may be used as a rate limit to prevent queue/node data structure 388 from exceeding a specified average transmit rate.

In addition, update rate 376 represents a rate at which credits are being updated by rate wheel 370. Update rate 376 provides a normalized dequeuing rate to queue/node data structure 388. In the example of FIG. 3, update rate 376 is the inverse of a rate update period for rate wheel 370. In some examples, scheduler 272 applies a low-pass filter to smooth instantaneous changes in the dequeuing rate.

Scheduler 272 includes credit adder 382, credit updater 392, rate updater 386, and queue/node data structure 388. Credit adder 382 of scheduler 272, based on input from clip 380, provides additional credits to rate updater 392 using MUX 384, which in turn provides such additional G/M credits 390 to queue/node data structure 388. Depending on the value of the current credits and clip 380, rate updater 392 may add some, all, or none of the credits to G/M credits 390 of queue/node data structure 388. Scheduler 272 uses G/M credits 390 to determine when queue/node data structure 388 is permitted to transmit. In some examples, when G/M credits 390 for queue/node data structure 388 are non-negative, scheduler 272 may dequeue or transmit packets from queue/node data structure 388. Upon dequeuing and transmitting the packets from queue/node data structure 388, credit updater 386 removes a corresponding number of credits from G/M credits 390 for queue/node data structure 388. Once G/M credits 390 for queue/node data structure 388 are negative, queue/node data structure 388 becomes ineligible for dequeuing or transmitting subsequent packets. Upon accumulating a non-negative value of G/M credits 390, queue/node data structure 388 again becomes permitted to dequeue or transmit packets.

Figure 4:
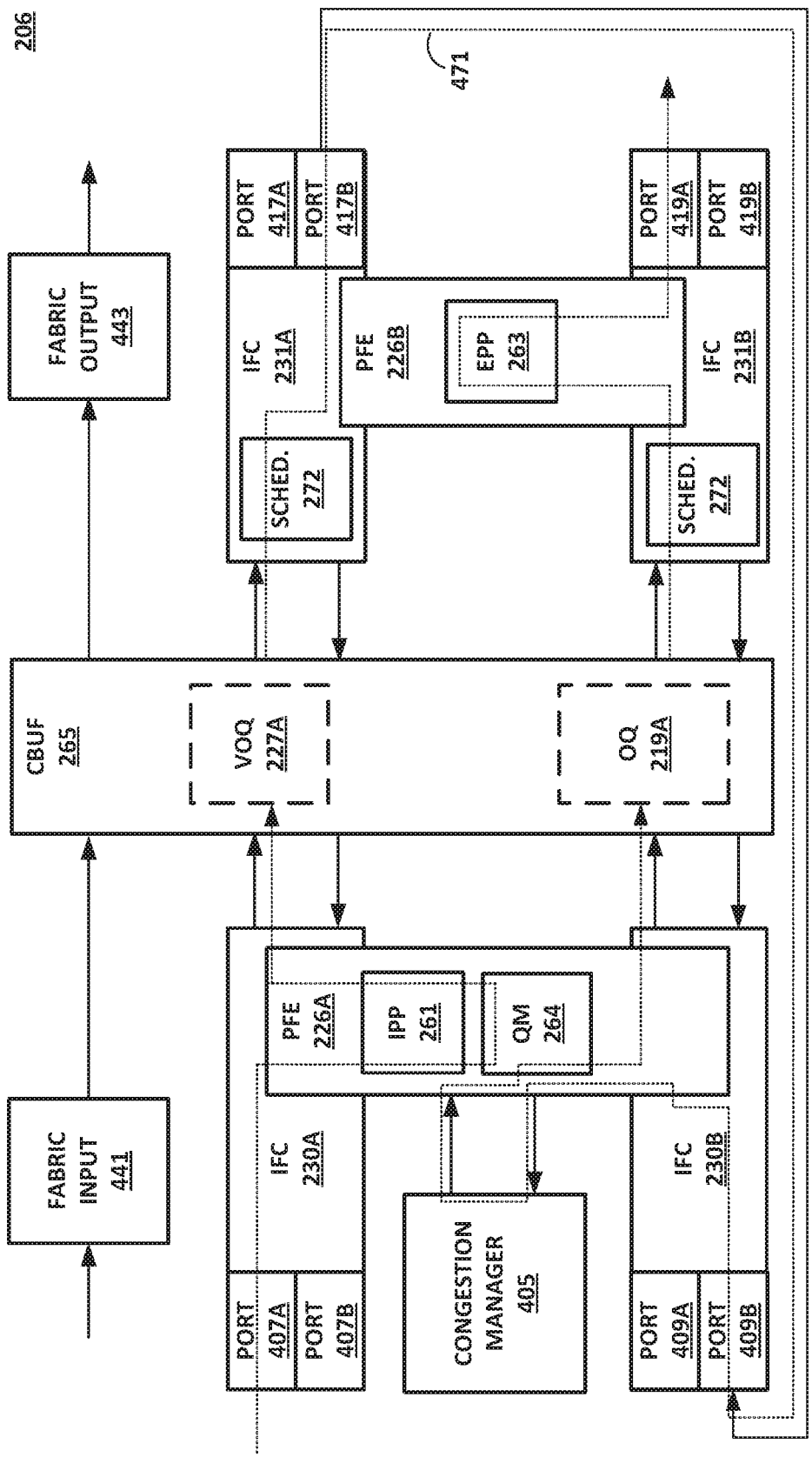
FIG. 4 is a block diagram illustrating an example router switching local network traffic using network packet loopback in accordance with techniques of this disclosure.

FIG. 4 is a block diagram illustrating an example first router 206 for switching local network traffic using loopback in accordance with techniques of this disclosure. FIG. 4 illustrates ports 407A-407B, 409A-409B, 417A-417B, 419A-419B, which may each represent single ports, a port group (PG), or other ports. Additionally, FIG. 4 illustrates congestion manager 405, which may be configured to perform a network packet drop check.

Congestion manager 405 may check each network packet that arrives at a queue (e.g., VOQ 227A, OQ 219A, etc.) for admittance by first learning a network packet size for a respective network packet, a priority for the respective network packet, and a drop precedence for the respective network packet. For example, congestion manager 405 may check each network packet by looking at a current queue length to see if the network packet would exceed a drop threshold, e.g., not fit. In this example, if congestion manager 405 determines that the network packet would exceed the drop threshold, congestion manager 405 may drop the network packet (e.g., not written to queue). If congestion manager 405 determines that the network packet would not exceed the drop threshold (e.g., the network packet is not dropped), congestion manager 405 may admit the network packet to the queue. In addition to tail drop thresholds, congestion manager 405 may compare a network packet with Weighted random early detection (WRED) thresholds, which determine a random probability of dropping based on priority and drop precedence.

As shown, router 206 includes a fabric input 441 configured to receive network packets from the fabric (e.g., network 104, the Internet, etc.) and a fabric output 443 configured to output network packets to the fabric. To avoid the need for an addition drop check and enqueue bandwidth, FIG. 4 shows a router 206 that is configured for egress OQ using loopback on the packet forwarding engines 226. In the example of FIG. 4, packet forwarding engine 226A may operate as an ingress packet forwarding engine and packet forwarding engine 226B operates an egress packet forwarding engine. The loopback path 471 on packet forwarding engines 226 may help to preserve existing data paths. In this example, network packets may arrive on packet forwarding engine 226A input ports and router 206 may use "local switching" (e.g., without using fabric input 441, fabric output 443, etc.) to move to the network packets to egress without the need for fabric. Because half the PGs may be used for loopback to emulate OQ scaling packet forwarding engine, only half of a total throughput may be used for network packet forwarding. Network packets may make two trips through CBUF 265 and ingress packet forwarding engine 226A and egress packet forwarding engine 226B, which may reduce the throughput of packet forwarding engines 226.

FIG. 4 shows a local switching example using CBUF 265. In the example of FIG. 4, the packet is preserved in the header information when looping back to ingress from egress through a PG (e.g., port 409B). In this example, a network packet that comes into an input port (e.g., port 407A) at ingress is switched through CBUF 265 to packet forwarding engine 226B that has the destination output port, looped back to ingress packet forwarding engine 226A and stored in VOQ 227A. Scheduler 272 at egress schedules reading from VOQ 227A to port 419A, which is done via metadata since the actual packet data remains in CBUF 265 until read out at egress before being sent to EPP 263.

In accordance with the techniques of the disclosure, ingress packet forwarding engine 226A, may determine, in response to receiving a network packet, an egress packet forwarding engine for outputting a network packet. Ingress packet forwarding engine 226A may enqueue the network packet in virtual output queue 227A for output to the egress packet forwarding engine. For example, ingress packet forwarding engine 226A may enqueue the network packet in virtual output queue 227A of ingress packet forwarding engine 226A for output to egress packet forwarding engine 226B.

Egress packet forwarding engine 226B may output, in response to a first scheduling event (e.g., determined by scheduler 272) and to ingress packet forwarding engine 226A, the network packet with a header comprising information indicating the network packet in VOQ 227A and that the network packet is to be enqueued at OQ 219A for an output port of the egress packet forwarding engine 226B. For instance, scheduler 272 may determine the first scheduling event based on a dequeue rate at VOQ 227A.

Scheduler 272 may maintain per queue shaping and priority information. When a queue (e.g., VOQ 227A, OQ 219A, etc.) becomes non-empty, scheduler 272 may install the queue in the scheduler hierarchy (e.g., "enqueue") at the configured queue priority. When the rate shaping requirements are not met, e.g., the queue has not transmitted enough data yet, and the queue is at the current serviceable priority, scheduler 272 may select the queue for service by scheduler 272 (e.g., "dequeue"). Once a queue has met the shaping requirement, e.g., the shaping rate is met, scheduler 272 may remove the queue from service until a time when the queue receives addition or new shaping credits and can resume transmission again. Scheduler 272 may determine an amount of shaping credits a queue receives in a time period to determine a rate for the queue.

Egress packet forwarding engine 226B may output the network packet with the header from a first port (e.g., port 417B) of the egress packet forwarding engine 226B to a second port (e.g., 409B) of ingress packet forwarding engine 226A. Ingress packet forwarding engine 226B may, in response to receiving the network packet with the header, perform a drop check for the network packet.

In response to receiving the network packet with the header, ingress packet forwarding engine 226A may dequeue the network packet from virtual output queue 227A and enqueue the network packet to output queue 219A. In response to a second scheduling event that is after the first scheduling event, egress packet forwarding engine 226B may dequeue the network packet from output queue 227A and output the network packet at the output port (e.g., output port 419A). For instance, scheduler 272 may determine the second scheduling event based on a dequeue rate at OQ 219A. While scheduler 272 may determine the first scheduling event using information from queues from multiple packet forwarding engines (e.g., packet forwarding engine 226A, packet forwarding engine 226B, etc.), schedule 272 may determine the second scheduling event using only information for queues on packet forwarding engine 226B. As such, the first scheduling event may be considered a "coarse" scheduling while the second scheduling event may be considered a "fine" scheduling.

Figure 5:
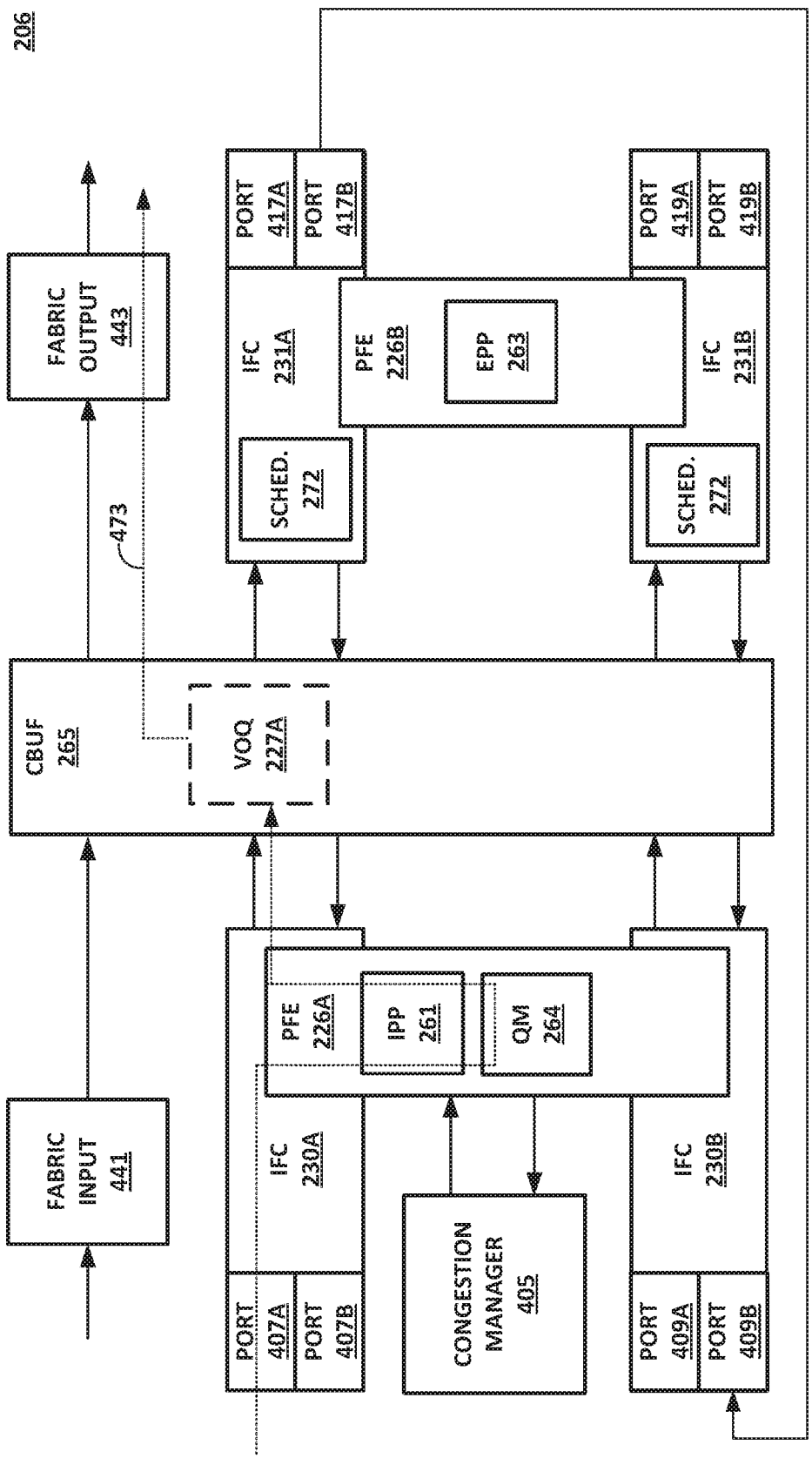
FIG. 5 is a block diagram illustrating an example router switching fabric network traffic to egress using network packet loopback in accordance with techniques of this disclosure.

FIG. 5 is a block diagram illustrating an example router for switching fabric network traffic to egress using network packet loopback in accordance with techniques of this disclosure. FIG. 5 shows network switching along path 473 where a network packet arrives at port 407A and is stored in CBUF 265, specifically VOQ 227A, at ingress. Sometime later (e.g., during a scheduling event), packet forwarding engine 226A reads the network packet out of CBUF 265 and outputs the network packet to fabric output 443 to send the network packet across the fabric to a destination packet forwarding engine.

FIG. 6 is a block diagram illustrating an example router for switching fabric network traffic from ingress using network packet loopback in accordance with techniques of this disclosure. FIG. 6 shows a network switching along path 475 where a network packet arriving (e.g., read by fabric input 441) from across the fabric by scheduler 272 and arriving at egress packet forwarding engine 226B. Egress packet forwarding engine 226B stores the network packet in OQ 219A in CBUF 265. Scheduler 272 reads the network packet out and loops the network packet back to ingress packet forwarding engine 226A through the egress PG (e.g., port 417B) to the ingress PG (e.g., port 407B).

For example, egress packet forwarding engine 226B may output, in response to a first scheduling event (e.g., determined by scheduler 272) and to ingress packet forwarding engine 226A, the network packet with a header comprising information indicating the network packet in VOQ 227A and that the network packet is to be enqueued at OQ 219A for an output port of the egress packet forwarding engine 226B. For instance, egress packet forwarding engine 226B may output the network packet with the header from a first port (e.g., port 417B) of the egress packet forwarding engine 226B to a second port (e.g., 409B) of ingress packet forwarding engine 226A. Ingress packet forwarding engine 226B may, in response to receiving the network packet with the header, perform a drop check for the network packet.

In response to receiving the network packet with the header, ingress packet forwarding engine 226A may dequeue the network packet from virtual output queue 227A and enqueue the network packet to output queue 219A. For instance, IPP 261 of ingress packet forwarding engine 226A stores the network packet in the ingress VOQ (e.g., VOQ 227). Scheduler 272 may later schedule the network packet to the port by the Egress GS (e.g., port 417A). For example, egress packet forwarding engine 226B may dequeue, in response to a second scheduling event that is after the first scheduling event, the network packet from output queue 227A and output the network packet at the output port (e.g., output port 419A).

FIG. 7 is a block diagram illustrating an example router 206 for switching local network traffic using metadata loopback in accordance with techniques of this disclosure. FIG. 7 illustrates an example router 206 that uses a loopback once the packet is stored in CBUF by recirculating only the packet header and metadata from egress packet forwarding engine 226B to ingress packet forwarding engine 226A. FIG. 7 shows router 206 is configured for egress OQ. Network packets that arrive on ingress input ports (e.g., ports 407A, 407B, 409A, 409B, etc.) may use "local switching" to move to egress without the need for the fabric (e.g., fabric input 441, fabric output 443, etc.).

In accordance with the techniques of the disclosure, ingress packet forwarding engine 226A may determine, in response to receiving a network packet, an egress packet forwarding engine for outputting a network packet. Ingress packet forwarding engine 226A may enqueue the network packet in virtual output queue 227A for output to the egress packet forwarding engine. For example, ingress packet forwarding engine 226A may enqueue the network packet in virtual output queue 227A for output to egress packet forwarding engine 226B.

Egress packet forwarding engine 226B may output, to ingress packet forwarding engine 226A, metadata comprising information indicating the network packet in VOQ 227A and that the network packet is to be enqueued at OQ 219A for an output port (e.g., port 419A) of egress packet forwarding engine egress packet forwarding engine 226B to ingress packet forwarding engine 226A and refrain from outputting the network packet (e.g., packet payload) to ingress packet forwarding engine 226A. For instance, egress packet forwarding engine 226B may output the header data and/or metadata to the ingress packet forwarding engine using local switching (e.g., using CBUF 265).

In response to receiving the metadata, ingress packet forwarding engine 226A may dequeue the network packet from virtual output queue 227A and enqueue the network packet to output queue 219A. In response to a second scheduling event that is after the first scheduling event, egress packet forwarding engine 226B may dequeue the network packet from output queue 227A and output the network packet at the output port (e.g., output port 419A).

FIG. 8 is a block diagram illustrating an example router for switching fabric network traffic from ingress using metadata loopback in accordance with techniques of this disclosure. Fabric input 441 receives network packets from the fabric and congestion manager 405 performs a drop check. If congestion manager 405 determines that the network packet is allowed, ingress packet forwarding engine 226A enqueues the network packet to OQ 219A for scheduling to the port (e.g., port 417A). FIG. 8 shows path 479 through router 206 to support the combined input queue and OQ model. However, this may use an additional drop check and enqueue bandwidth in order to store the network packet from the fabric in CBUF 265 in addition to those packets coming from locally switched ports on ingress packet forwarding engine 226A.

Egress packet forwarding engine 226B may output, in response to a first scheduling event and to ingress packet forwarding engine 226A, metadata comprising information indicating the network packet in VOQ 227A and that the network packet is to be enqueued at OQ 219A for an output port (e.g., port 419A) of egress packet forwarding engine egress packet forwarding engine 226B to ingress packet forwarding engine 226A and refrain from outputting the network packet (e.g., packet payload) to ingress packet forwarding engine 226A. For instance, egress packet forwarding engine 226B may output the header data and/or metadata to the ingress packet forwarding engine using local switching (e.g., using CBUF 265).

In response to receiving the metadata, ingress packet forwarding engine 226A may dequeue the network packet from virtual output queue 227A and enqueue the network packet to output queue 219A. In response to a second scheduling event that is after the first scheduling event, egress packet forwarding engine 226B may dequeue the network packet from output queue 227A and output the network packet at the output port (e.g., output port 419A).

Figure 9:
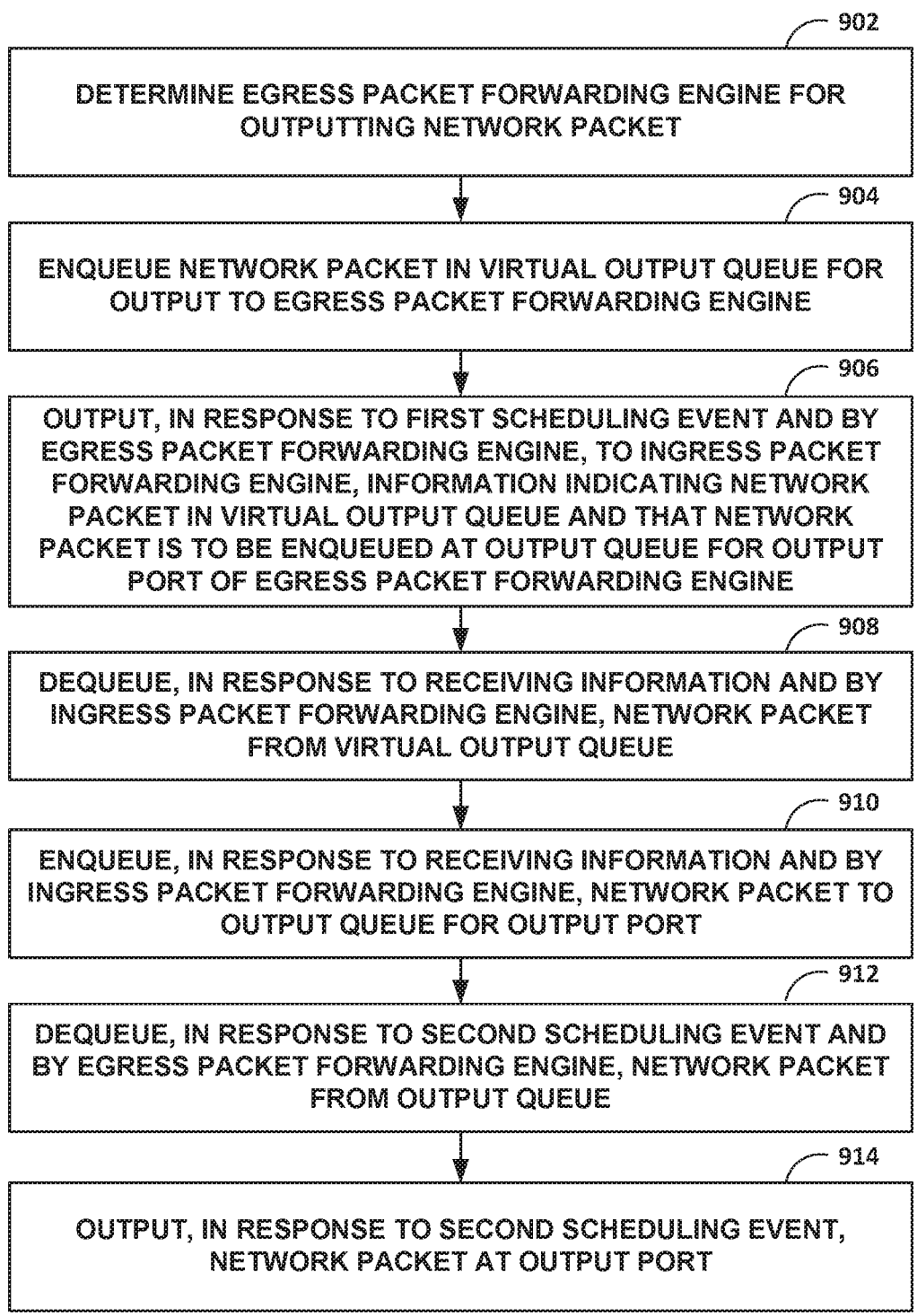
FIG. 9 is a block diagram illustrating an example process for switching network traffic in accordance with techniques of this disclosure.

FIG. 9 is a block diagram illustrating an example first process for switching network traffic in accordance with techniques of this disclosure. Ingress packet forwarding engine 226A may determine, in response to receiving a network packet, an egress packet forwarding engine for outputting a network packet (902). For example, ingress packet forwarding engine 226A may determine an egress packet forwarding engine (e.g., egress packet forwarding engine 226B).

Ingress packet forwarding engine 226A may enqueue the network packet in virtual output queue 227A for output to the egress packet forwarding engine (904). For example, ingress packet forwarding engine 226A may enqueue the network packet in virtual output queue 227A for output to egress packet forwarding engine 226B. In some examples, VOQ 227A is a combined buffer (e.g., CBUF 265) for ingress packet forwarding engine 226A and the set of egress packet forwarding engines. For instance, ingress packet forwarding engine 226A may enqueue the network packet in a first portion of CBUF 265 that is assigned to virtual output queue 227A of ingress packet forwarding engine 226A for output to egress packet forwarding engine 226B.

Egress packet forwarding engine 226B may output, in response to a first scheduling event and to ingress packet forwarding engine 226A, information indicating the network packet in the virtual output queue and that the network packet is to be enqueued at an output queue for an output port of the egress packet forwarding engine 226B (906). For example, egress packet forwarding engine 226B may output, to ingress packet forwarding engine 226A, the network packet with a header comprising the information. In some examples, egress packet forwarding engine 226B may output, to ingress packet forwarding engine 226A, the network packet with a header comprising the information. For instance, egress packet forwarding engine 226B may output the network packet with the header from a first port of the egress packet forwarding engine to a second port of ingress packet forwarding engine 226A. Ingress packet forwarding engine 226B may, in response to receiving the network packet with the header, perform a drop check for the network packet.

In some examples, egress packet forwarding engine 226B may output metadata comprising the information to ingress packet forwarding engine 226A and refrain from outputting the network packet to ingress packet forwarding engine 226A. For instance, egress packet forwarding engine 226B may output the metadata to the ingress packet forwarding engine using local switching.

In some examples, scheduler 272 may select the output port from a plurality of output ports at egress packet forwarding engine 226B. In this example, scheduler 272 or another component of egress packet forwarding engine 226B may generate the information to specify that the network packet is to be enqueued at the output queue based on the selection of the output port by scheduler 272. In some examples, scheduler 272 may determine the first scheduling event to regulate a speed at which data is exchanged from router 206. For instance, scheduler 272 may determine the first scheduling event based on a dequeue rate at OQ 219A.

Ingress packet forwarding engine 226A may dequeue, in response to receiving the information, the network packet from virtual output queue 227A (908) and enqueue the network packet to output queue 219A (910). For example, ingress packet forwarding engine 226A may dequeue the network packet from the first portion of CBUF 265 assigned to virtual output queue 227A. In some examples, ingress packet forwarding engine 226A may enqueue the network packet to a second portion of CBUF 265 assigned to output queue 219A.

Egress packet forwarding engine 226B may dequeue, in response to a second scheduling event that is after the first scheduling event, the network packet from output queue 227A (912) and output the network packet at the output port (914). For example, egress packet forwarding engine 226B may dequeue the network packet from the second portion of CBUF 265. In some examples, scheduler 272 may determine the second scheduling event to regulate a speed at which data is exchanged from router 206. For example, scheduler 272 may determine the second scheduling event based on a dequeue rate at OQ 219A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), EPROM, EEPROM, flash memory, a hard disk, a CD-ROM, a floppy disk, a cassette, magnetic media, optical media, or other computer readable media.

The invention claimed is:

1. An apparatus for switching network traffic, the apparatus comprising:
    an ingress packet forwarding engine implemented in circuitry and configured to:
        determine, in response to receiving a network packet, an egress packet forwarding engine for outputting the network packet; and
        enqueue the network packet in a virtual output queue for output to the egress packet forwarding engine;
    the egress packet forwarding engine implemented in processing circuitry and comprising a scheduler configured to select an output port from a plurality of output ports at the egress packet forwarding engine and to determine a first scheduling event and a second scheduling event to regulate a speed at which data is exchanged from the apparatus, wherein the egress packet forwarding engine is configured to, in response to the first scheduling event, output, to the ingress packet forwarding engine, information indicating the network packet in the virtual output queue and that the network packet is to be enqueued at an output queue for the selected output port of the egress packet forwarding engine;
    wherein the ingress packet forwarding engine is further configured to, in response to receiving the information:
        dequeue the network packet from the virtual output queue; and
        enqueue the network packet to the output queue; and wherein the egress packet forwarding engine is further configured to, in response to the second scheduling event that is after the first scheduling event:
dequeue the network packet from the output queue; and
output the network packet at the selected output port.

2. The apparatus of claim 1, wherein, to output the information, the egress packet forwarding engine is configured to output, to the ingress packet forwarding engine, the network packet with a header comprising the information.

3. The apparatus of claim 2, wherein, in response to receiving the network packet with the header, the ingress packet forwarding engine is configured to:
perform a drop check for the network packet.

4. The apparatus of claim 2, wherein, to output the network packet with the header, the egress packet forwarding engine is configured to output the network packet with the header from a first port of the egress packet forwarding engine to a second port of the ingress packet forwarding engine.

5. The apparatus of claim 1, wherein, to output the information, the egress packet forwarding engine is configured to output metadata comprising the information to the ingress packet forwarding engine and refrain from outputting the network packet to the ingress packet forwarding engine.

6. The apparatus of claim 5, wherein, to output the metadata, the egress packet forwarding engine is configured to output the metadata to the ingress packet forwarding engine using local switching.

7. The apparatus of claim 1, comprising:
a combined buffer for the ingress packet forwarding engine and the egress packet forwarding engine,
wherein, to enqueue the network packet in the virtual output queue, the ingress packet forwarding engine is configured to enqueue the network packet in a first portion of the combined buffer assigned to the virtual output queue;
wherein, to dequeue the network packet from the virtual output queue, the egress packet forwarding engine is configured to dequeue the network packet from the first portion of the combined buffer;
wherein, to enqueue the network packet the network packet to the output queue, the egress packet forwarding engine is configured to enqueue the network packet in a second portion of the combined buffer assigned to the output queue; and
wherein, to dequeue the network packet from the output queue, the egress packet forwarding engine is configured to dequeue the network packet from the second portion of the combined buffer.

8. The apparatus of claim 1, wherein, to output the information, the egress packet forwarding engine is configured to output metadata comprising the information to the ingress packet forwarding engine and refrain from outputting the network packet to the ingress packet forwarding engine.

9. A method comprising:
determining, in response to receiving a network packet and by an ingress packet forwarding engine implemented in processing circuitry, an egress packet forwarding engine for outputting the network packet;
enqueuing, by the ingress packet forwarding engine, the network packet in a virtual output queue for output to the egress packet forwarding engine;
selecting, by a scheduler implemented in circuitry, an output port from a plurality of output ports at the egress packet forwarding engine; and determining, by the scheduler, a first scheduling event and a second scheduling event to regulate a speed at which data is exchanged;
outputting, in response to the first scheduling event and by the egress packet forwarding engine implemented in processing circuitry, to the ingress packet forwarding engine, information indicating the network packet in the virtual output queue and that the network packet is to be enqueued at the selected output queue for an output port of the egress packet forwarding engine;
dequeuing, in response to receiving the information and by the ingress packet forwarding engine, the network packet from the virtual output queue and enqueuing, by the ingress packet forwarding engine, the network packet to the output queue; and
dequeuing, in response to the second scheduling event that is after the first scheduling event and by the egress packet forwarding engine, the network packet from the output queue and outputting, by the egress packet forwarding engine, the network packet at the selected output port.

10. The method of claim 9, wherein outputting the information comprises outputting, to the ingress packet forwarding engine, the network packet with a header comprising the information.

11. The method of claim 10, comprising:
performing, in response to receiving the network packet with the header and by the ingress packet forwarding engine, a drop check for the network packet.

12. The method of claim 10, wherein outputting the network packet with the header comprises outputting the network packet with the header from a first port of the egress packet forwarding engine to a second port of the ingress packet forwarding engine.

13. The method of claim 9, wherein outputting the information comprises outputting metadata comprising the information to the ingress packet forwarding engine and refraining from outputting the network packet to the ingress packet forwarding engine.

14. The method of claim 13, wherein outputting the metadata comprises outputting the metadata to the ingress packet forwarding engine using local switching.

15. The method of claim 9,
wherein enqueuing the network packet in the virtual output queue comprises enqueuing the network packet in a first portion of a combined buffer for the ingress packet forwarding engine and the egress packet forwarding engine that is assigned to the virtual output queue;
wherein dequeuing the network packet from the virtual output queue comprises dequeuing the network packet from the first portion of the combined buffer;
wherein enqueuing the network packet the network packet to the output queue comprises enqueuing the network packet in a second portion of the combined buffer assigned to the output queue; and
wherein dequeuing the network packet from the output queue comprises dequeuing the network packet from the second portion of the combined buffer.

16. An apparatus for switching network traffic, the apparatus comprising:
a plurality of interface cards;
an ingress packet forwarding engine implemented in circuitry and configured to:

determine, in response to receiving a network packet with the plurality of interface cards, an egress packet forwarding engine for outputting the network packet; and enqueue the network packet in a virtual output queue for output to the egress packet forwarding engine;

the egress packet forwarding engine implemented in processing circuitry and comprising a scheduler configured to select an output port from a plurality of output ports at the egress packet forwarding engine and to determine a first scheduling event and a second scheduling event to regulate a speed at which data is exchanged from the apparatus, wherein the egress packet forwarding engine is configured to, in response to the first scheduling event, output, to the ingress packet forwarding engine, information indicating the network packet in the virtual output queue and that the network packet is to be enqueued at an output queue for the selected output port of the egress packet forwarding engine;

wherein the ingress packet forwarding engine is further configured to, in response to receiving the information:

dequeue the network packet from the virtual output queue; and enqueue the network packet to the output queue; and wherein the egress packet forwarding engine is further configured to, in response to the second scheduling event that is after the first scheduling event:

dequeue the network packet from the output queue; and output, with the plurality of interface cards, the network packet at the selected output port.

17. The apparatus of claim 16, wherein, to output the information, the egress packet forwarding engine is configured to output, to the ingress packet forwarding engine, the network packet with a header comprising the information.

18. The apparatus of claim 16, wherein, to output the network packet with the header, the egress packet forwarding engine is configured to output the network packet with the header from a first port of the egress packet forwarding engine to a second port of the ingress packet forwarding engine.

* * * * *